June 22, 1926.
D. B. MILLER
1,589,541
THREAD CUTTING DEVICE FOR HOSE COUPLINGS
Filed June 21, 1924        2 Sheets-Sheet 1
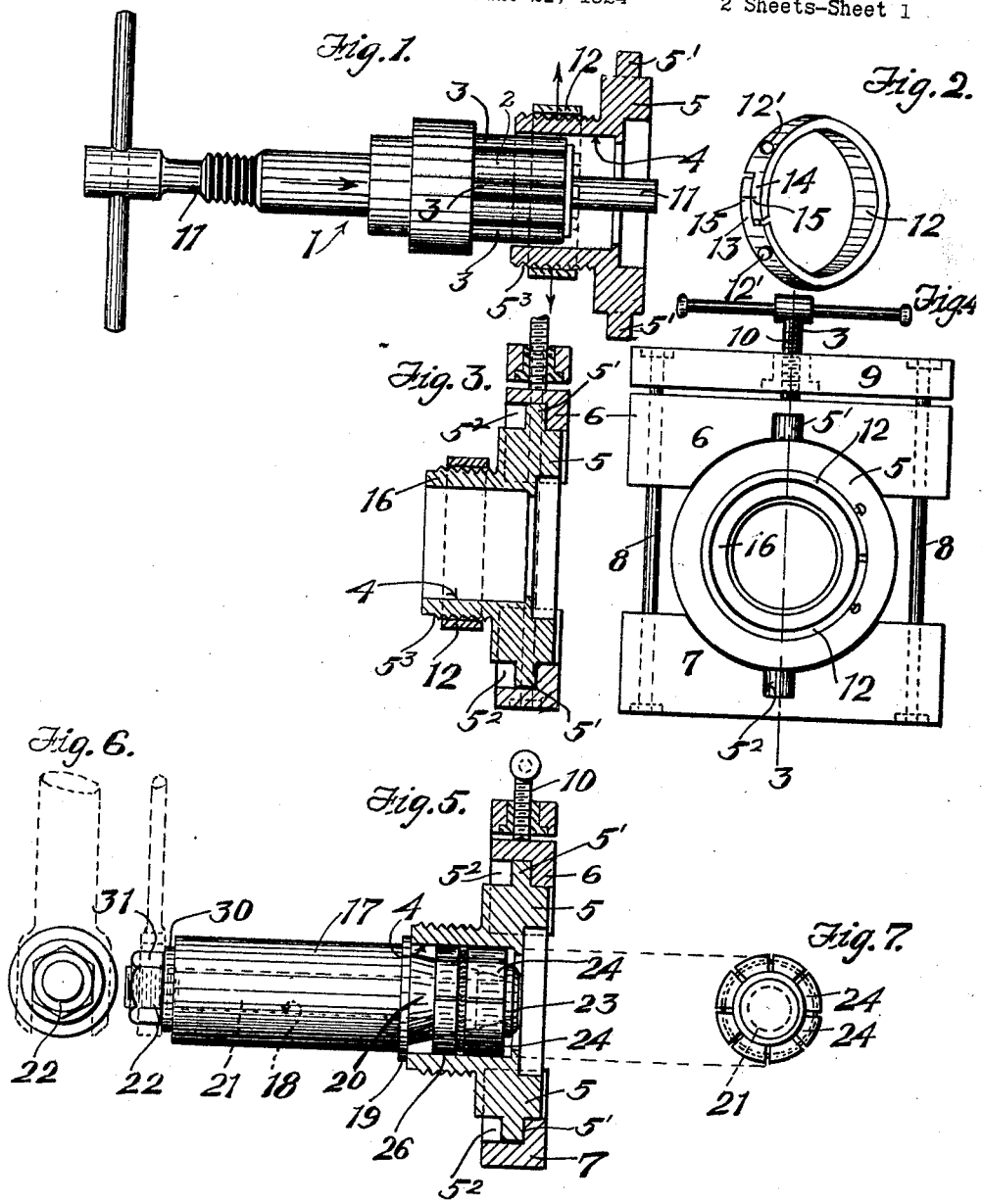
INVENTOR.
David B. Miller.
BY
Harry W. Bown.
ATTORNEY.

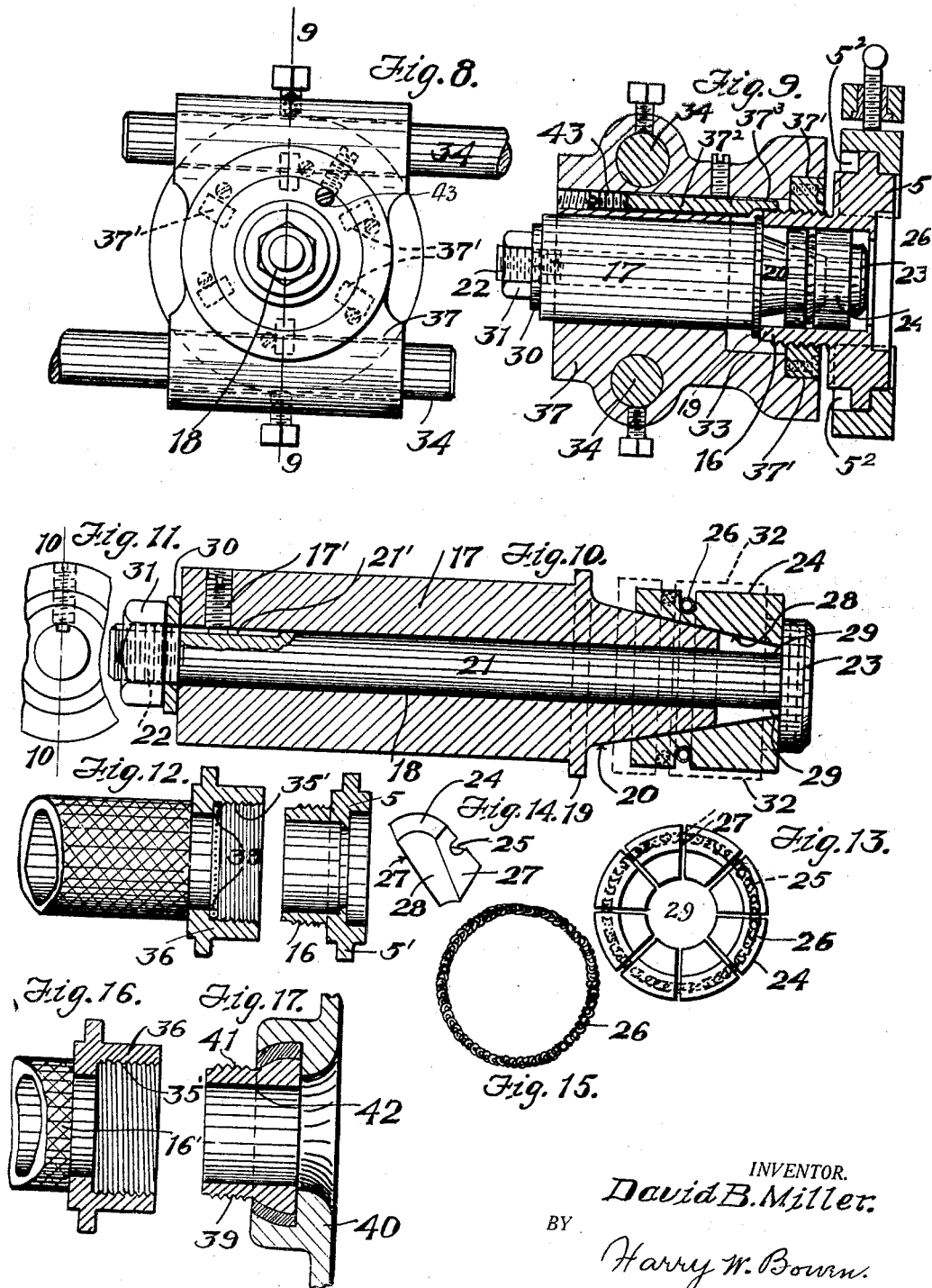

Patented June 22, 1926.

1,589,541

UNITED STATES PATENT OFFICE.

DAVID B. MILLER, OF GREENFIELD, MASSACHUSETTS, ASSIGNOR TO THE WELLS CORPORATION, OF GREENFIELD, MASSACHUSETTS, A CORPORATION OF MASSACHUSETTS.

THREAD-CUTTING DEVICE FOR HOSE COUPLINGS.

Application filed June 21, 1924. Serial No. 721,424.

This invention relates to improvements in devices for cutting threads on hose couplings which are used to connect sections of fire hose together and also to cut threads of the same size on the threaded projections of fire hydrants.

An object of the invention is to provide a device by means of which the threads of fire hose couplings and fire hydrants of different sizes that are used in different cities may be readily connected. It frequently happens that in case of large fires when one town or city is called on for assistance that its hose couplings do not fit together. In the event the couplings in one city are smaller in diameter than those of a standard size, I have discovered that by means of a suitable expanding device, the couplings of smaller diameter may be materially and sufficiently increased, whereby a new and standard size thread may be cut on the smaller coupling which has been so expanded, and, on the other hand, if the diameters of the couplings are too large a new and standard sized thread may be cut so that a uniform thread size may be used. In other words my improvement is to provide a device for standardizing the threads of fire hose couplings and the fire hydrant.

Broadly my invention includes a member for expanding or increasing the diameter of one of the coupling members in case the same is too small, and, after the coupling member has been expanded to the desired size, a new thread is then cut with a die. A new internal thread is then cut in the other coupling member so that the other coupling member may be readily threaded into the same.

A device or gauge is employed which is placed around the threads of the coupling member to be expanded for accurately indicating when the correct enlarged diameter is reached and before the new or standard thread is cut. A suitable clamping device is provided for holding the coupling member while it is being expanded and while the new thread is being cut.

A further object of my invention is in providing a device which is inserted within the enlarged or expanded coupling member and readily clamped thereto by means of an expanding implement which is formed with a series of segments that frictionally engages the internal surface of the coupling. This implement or member is then inserted within the thread forming die which is then rotated about this implement or member as a bearing, and, upon the rotation of the thread forming die a new thread is accurately cut on the coupling member. That is to say, the old external thread is recut to a standard size. The device may be used for recutting the old thread on the threaded hose attaching part of the fire hydrant. I also employ in connection with the thread forming die a member to produce the Higbee cut to remove the last thread.

By means of this device it is possible to cut a uniform or standard thread on the coupling members of the hose of fire apparatus and also on the fire hydrants which are located in the streets and with which the fire hose is connected. By having a uniform thread, the fire-hose couplings of different cities may be instantly utilized in case of necessity. My present invention avoids the necessity of providing new couplings. It is designed for making the threads of existing couplings of uniform size.

Referring to the drawings:

Fig. 1 is a view showing the coupling expanding device which is about to be inserted in a coupling which is too small in diameter and prior to expanding the same; also showing the flat spring ring gauge which is placed on the external threads of the coupling.

Fig. 2 is a detail view of the spring ring gauge for indicating the correct diameter to which the coupling should be expanded before the old thread is recut.

Fig. 3 is a detail sectional view on the line 3—3 of Fig. 4 showing the coupling inserted in the clamp and prior to the operation of the expanding implement shown in Fig. 1.

Fig. 4 is a front elevational view of Fig. 3 looking from the left.

Fig. 5 is a view similar to Fig. 3 and showing the bearing device for the die inserted in the expanded coupling and retained therein by suitable internal expanding segmental sections.

Fig. 6 is a dotted line view looking from the left hand of Fig. 5 showing the wrench for operating the segmental sections of the implement for forcing them radially outward against the internal surface of the coupling.

Fig. 7 is an end elevational view of the right hand end of the implement which is frictionally retained in the die for providing a bearing for the thread forming die.

Fig. 8 is an end elevational view of the thread forming die for rethreading the outer hub portion of the coupling and showing the same located on the bearing portion of the implement that is retained in the coupling while the new thread is being cut, also the part of the die for producing the Higbee cut.

Fig. 9 is a sectional view on the line 9—9 of Fig. 8 showing the position of the parts while a thread is being cut.

Fig. 10 is an enlarged detail view in section on the line 10—10 of Fig. 11 of the die bearing or supporting implement which is provided with radially movable elements for frictionally gripping the internal surface of the coupling.

Fig. 11 is an end view of Fig. 10.

Fig. 12 is a detail view of the two hose coupling members for connecting the adjacent ends of two lengths of hose.

Fig. 13 is a plan view of the radially movable elements for internally and frictionally gripping the inner surface of the expanded coupling and showing the different segments retained in place by the retractile spring, which is indicated in dotted lines.

Fig. 14 is a detail view of one of the arc-shaped segmental elements of the coupling gripping member shown in Fig. 13.

Fig. 15 is a detail view of the contractile spring for normally retaining the arc-shaped segments shown in Fig. 13 in place.

Fig. 16 is a detail view of one end of the hose about to be attached to a fire hydrant, and Fig. 17 is a detail view of the threaded hose attaching coupling of the fire hydrant to which the hose it attached.

Referring to the drawings in detail:

1 designates as a whole a suitable expanding tool which is provided with the hub portion 2 having a plurality of expanding rollers 3 loosely mounted therein. The hub portion 2 and the rollers 3 are inserted in the opening 4 of the externally threaded hose coupling member 5; it being understood that the externally threaded diameter of this coupling member is too small for recutting or forming a standard thread. The coupling member 5 is inserted between the clamping jaws 6 and 7; the jaw 7 being fixed and 6 being movable. These jaws are connected together by the rods 8, as shown. Located at the upper ends of the rods is the connecting bar member 9 through which passes the clamping screw 10, whereby when this is operated the jaw 6 is forced down against the hose coupling member 5 as shown in sectional view in Fig. 3. The spanner projections or lugs 5' are located in the recesses 5² of the jaws 6 and 7 to prevent the member 5 from turning and for positioning it. Upon the operation of the threaded shaft 11 of the expanding member, shown in Fig. 1, the rollers 3 are forced radially outward against the inner surface of the opening and with the result that the threaded external diameter of the coupling 5 is materially increased or expanded the desired distance, which distance is accurately indicated by the split gauge ring 12 shown in Fig. 2, that is formed of flat springy material, the overlapping ends 13 and 14 are formed with limit marks 15, which, when they register as indicated in Fig. 2, the correct external diameter is reached. 12' are small knobs for grasping the gauge.

The next step in the operation is the recutting of the external thread 5³ or in effect a new external thread on the hub portion 16 of the coupling 5. This is accomplished by temporarily attaching to the coupling member 5 the implement shown in detail in Figs. 5, 9, and 10, which comprises the barrel or bearing portion 17 for the thread forming die 37 and cutters 37', see Figs. 8 and 9, which implement is formed with an opening 18 therethrough. This implement is formed with a flange portion 19 and a cone shaped or tapered portion 20. 21 is a rod or shaft formed with a threaded end 22 and a head portion 23. Located on the conical shaped portion 20 is a series of arc shaped segments 24, each one of which is formed with a groove 25 which are placed in matching relation to each other and in the grooves is located a contractile coil spring 26 which normally draws the segments 24 together so that their side surfaces 27 are in contact with each other as shown in Fig. 13. A detail view of one of these segmental shaped members is shown in Fig. 14. These are each formed with a tapered and curved surface 28 that engages the conical or tapered surface of the cone shaped part 20. The bolt 21 passes through the centrally located opening 29 of the radially movable segments shown assembled in Fig. 13. After these segments are placed on the cone shaped portion 20 and the bolt 21 is inserted the washer 30 and nut 31 are placed on the threaded end of the bolt. When the nut 31 is tightened the segmental members 24 are forced radially outward into the dotted line position 32 by sliding on the conical surface 20 whereby their normal diameter is increased. These segments are shown in Figs. 5 and 9, frictionally gripping the internal surface 4 of the hub portion 16 of the coupling member 5, whereby the die bearing member 17 is firmly attached to the coupling member 5 against displacement. The outer end of the hub portion 16 of the coupling rests against the flange 19 as shown in Fig. 9. The die 37 for recutting the thread on the outer surface of the hub portion 16 is now slipped onto the bearing member 17 which serves as a means for very accurately aligning the die holder and its cutters 37' with the axis of the coupling 5 so that when the die is rotated by means of the handles 34 a new and standard thread will be formed on the outer surface of the flange portion of the coupling. Heretofore, its has been found a difficult matter to accurately form a new thread on the flange portion 16 and one which would always be in parallel relation with the axis of the flanges. This objection is thoroughly overcome in my construction and a new thread is accurately formed, when the die is rotated on the bearing 17.

It is of course understood that a new standard internal thread 35' should be cut on the adjacent coupling member 36 shown in Fig. 12 by means of a standard tap the threads of which would correspond with the threads of the cutters 37' of the die 37, therefore when the new threads are cut on the two coupling members they will match and the couplings may be connected. A suitable packing ring 38 is provided against which the end of the flange member 16 rests when the couplings are united, in order to provide a water tight joint.

In order to recut the threads on the part or member 39 of the fire hydrant casing 40 in case the external diameter is too small, it is to be understood that the expanding member shown in Fig. 1 is first employed as already described and the ring gauge 12 shown in Fig. 2 is placed on the threads 41 to indicate the desired new external diameter. The bearing member 17 for the thread forming die 37 is then inserted and the segmental members 24 are forced radially outward against the inner surface 42 for frictionally retaining it in place. The bearing member 17, as before described, furnishes a support for the die holder 37 for cutting a new standard thread on the portion 39, whereby the coupling 36 shown at the end of the hose 16' in Fig. 16 may be inserted. A screw key 17' enters the groove 21' for preventing the bolt 21 from rotating when the nut 31 is tightened.

It is to be understood that the finished piece which is formed by the die stock 37 is a standard one or, one of any desired size and number of threads.

An important feature of my improvement is to be understood as the means for temporarily and frictionally securing the die bearing member 17 to the inner surface of the flange portion of the coupling, after this flange has been expanded, to the desired diameter, as described.

Referring again to Fig. 9, 37² designates a cutter bar in the die stock 37. This bar is for the purpose of removing the part of the thread always left on the end of a bolt. It is known in the coupling art as the Higbee cut. These cutter bars are axially arranged in the die stock. If desired only one of the cutter bars 37² may be employed. This bar is moved forward and retained in place by the set screw 43. The inner end 37³ of the cutter bar will when the die stock is rotated remove the part of the thread that is left on the outer end of the coupling.

What I claim is:

1. A bearing device or guide for a thread cutting tool, comprising a member having an integral cone shaped part and formed with an opening through the member, a bolt in the opening, a plurality of separable pieces on the cone shaped part, a spring for normally retracting the pieces towards each other, a head on the bolt engaging the pieces for moving the said pieces outward when the bolt is tightened and means on the opposite end of the bolt for tightening the bolt for moving the separable pieces outward.

2. A device for frictionally engaging an inner cylindrical shaped surface including a cylindrical member having an integral cone shaped surface formed on its outer end, an integral flange adjacent the cone shaped surface, separable pieces on said surface extending substantially the length of said surface, means comprising a single spring for normally retaining the pieces in closed relation to each other on the cone shaped surface, and means comprising a bolt passing through said member, for expanding or moving the pieces radially outward and along the cone shaped surface.

3. A bearing member for the purpose described, having its outer end conical shaped and a flange at the inner end of the said conical part, a bolt receiving opening through the member, a plurality of separable segmental pieces located on the conical shaped end, a contractile spring surrounding the pieces for normally retaining the pieces in a closed position, means for securing the pieces on the cone shaped end including a bolt and a spline for preventing the bolt from turning, said flange serving to axially align the bearing member so that a true thread may be formed.

DAVID B. MILLER.